A. B. LANDIS.
VARIABLE SPEED GEARING.
APPLICATION FILED MAR. 31, 1911.

1,187,848.

Patented June 20, 1916.
4 SHEETS—SHEET 3.

Witnesses
L. A. Price
Frank E. Rapp

Inventor
Abraham B. Landis,
By E. O. Bradford
Attorney

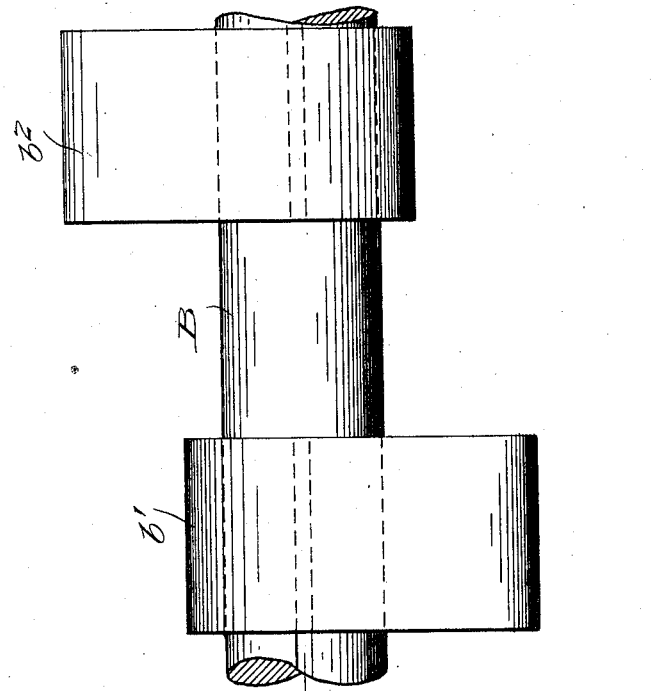
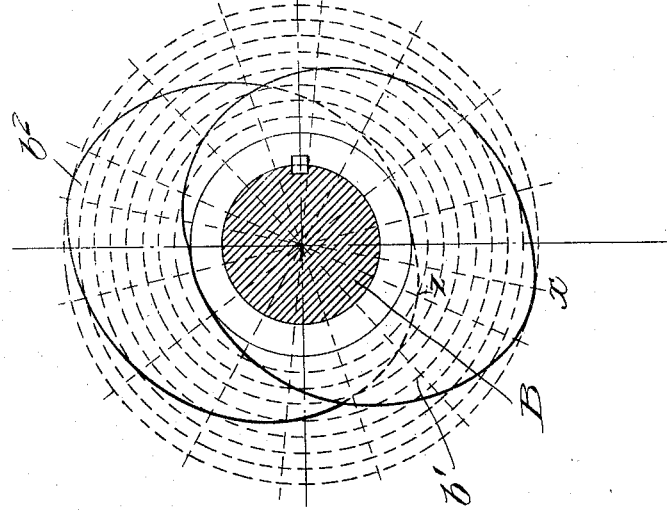

UNITED STATES PATENT OFFICE.

ABRAHAM B. LANDIS, OF ENFIELD, PENNSYLVANIA.

VARIABLE-SPEED GEARING.

1,187,848.  Specification of Letters Patent.  Patented June 20, 1916.

Application filed March 31, 1911. Serial No. 618,213.

*To all whom it may concern:*

Be it known that I, ABRAHAM B. LANDIS, a citizen of the United States, residing at Enfield, in the county of Montgomery and State of Pennsylvania, have invented certain new and useful Improvements in Variable-Speed Gearing, of which the following is a specification.

The object of my said invention is to produce a variable speed gearing which will be positive and constant in its operation, comparatively quiet, completely incased and protected from dirt and grit, and one wherein the change in speed may be effected gradually to any degree desired from the slowest to the highest for which the gearing is adapted, all as will be hereinafter more fully described and claimed.

Figure 1:
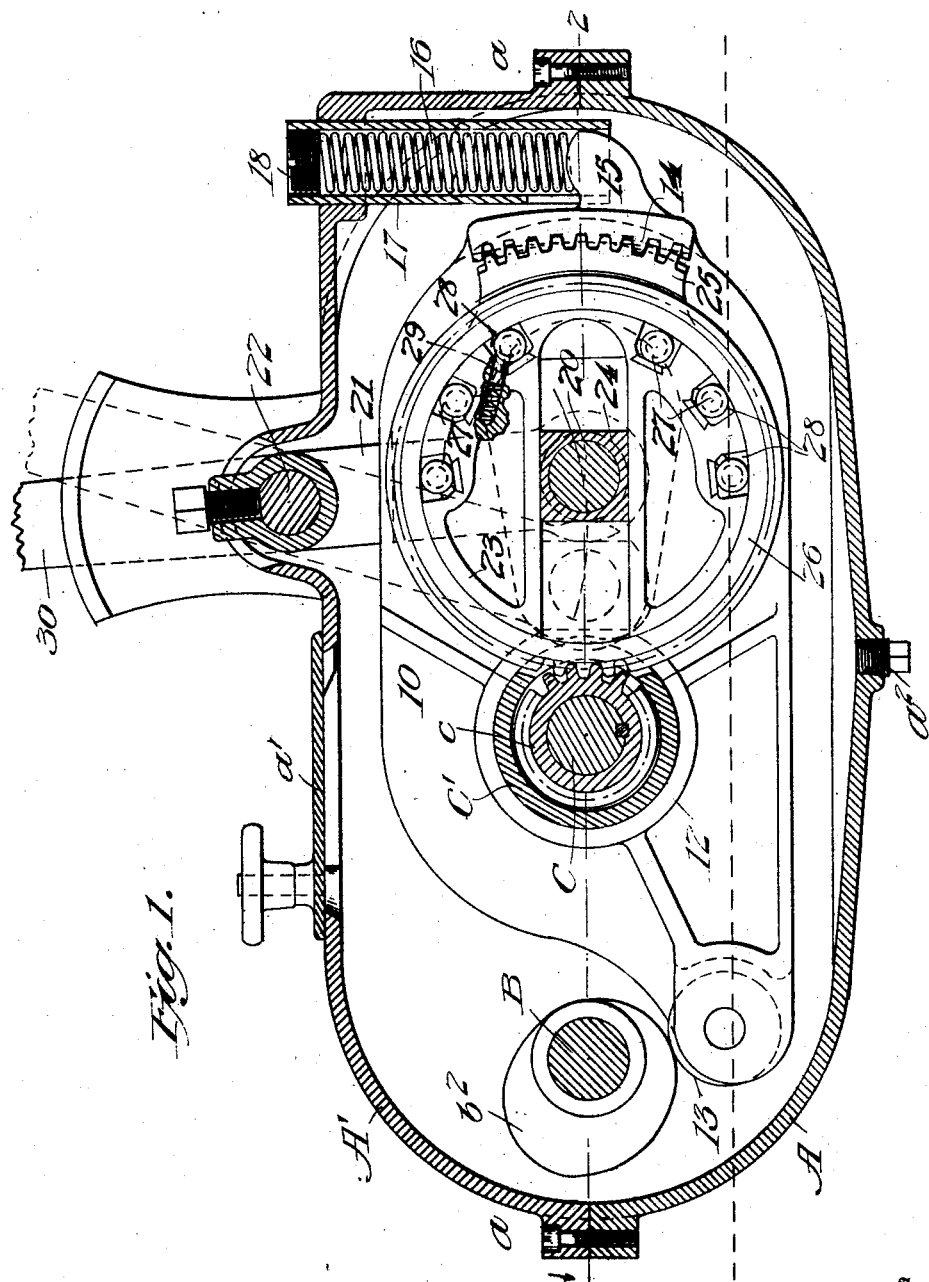
Figure 2:
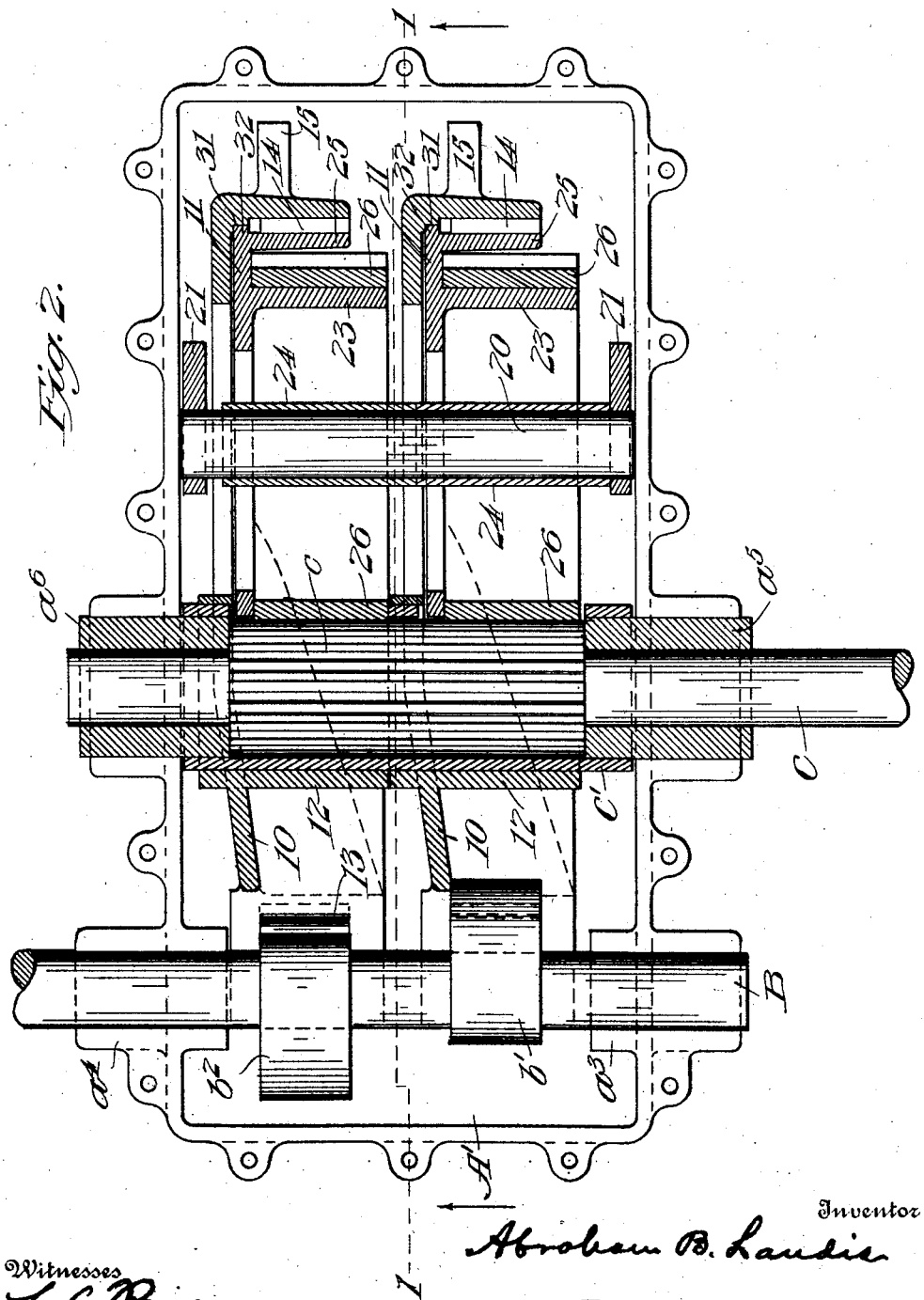

Referring to the accompanying drawings which are made a part hereof and on which similar reference characters indicate similar parts, Figure 1 is a longitudinal sectional view through a gear casing containing a gear constructed and arranged in accordance with my said invention, as seen when looking in the direction indicated by the arrows from the dotted line 1—1 in Fig. 2, Fig. 2 a horizontal section as seen when looking in the direction indicated by the arrows from the dotted line 2—2 in Fig. 1, Figs. 3, 4, 5, 6, 7 and 8 detail views of several parts separately to illustrate their form and construction more clearly, Fig. 9 a detail view of a portion of the cam-shaft, and Fig. 10 a diagrammatic view illustrating the operation of said cams.

In said drawings the portions marked A represent the casing, B the driving shaft and C the driven shaft.

The casing A is of a form appropriate to inclose the various parts of the gearing and support the bearings for the different shafts, as best shown in Figs. 1 and 2. It is preferably composed of two parts, the lower part A having a top portion $A'$ secured thereto by bolts $a$ projecting through ears on the respective parts arranged at suitable intervals around their edges. Said part $A'$ has an opening provided with a cover $a'$ through which oil may be introduced, or the gear examined when desired. The bottom portion A is preferably inclined from all sides to a central point where a drain hole is formed, the same being closed by a screw-plug $a^2$ through which the casing may be cleaned as occasion may require.

The engine or driving shaft B is journaled in suitable bearings $a^3$ and $a^4$ in the casing, as shown, and carries two cams $b'$ and $b^2$ fixed thereon and extending oppositely to each other, as best shown in Figs. 9 and 10.

The driven shaft C is journaled in suitable bearings $a^5$ and $a^6$ in the casing A parallel with and adjacent to the driving shaft B and is provided with a long central gear $c$ which my be secured to said shaft by a key, as shown in Fig. 1, or may be made integral with said shaft C.

Figure 3:
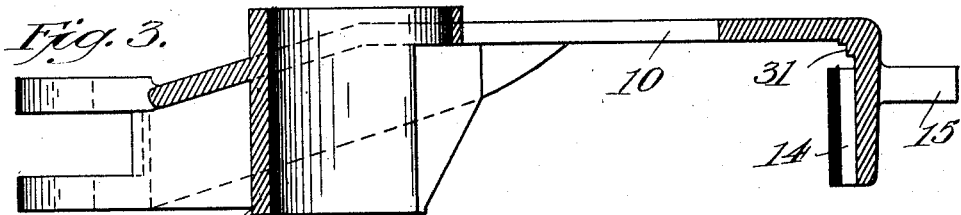
Figure 4:
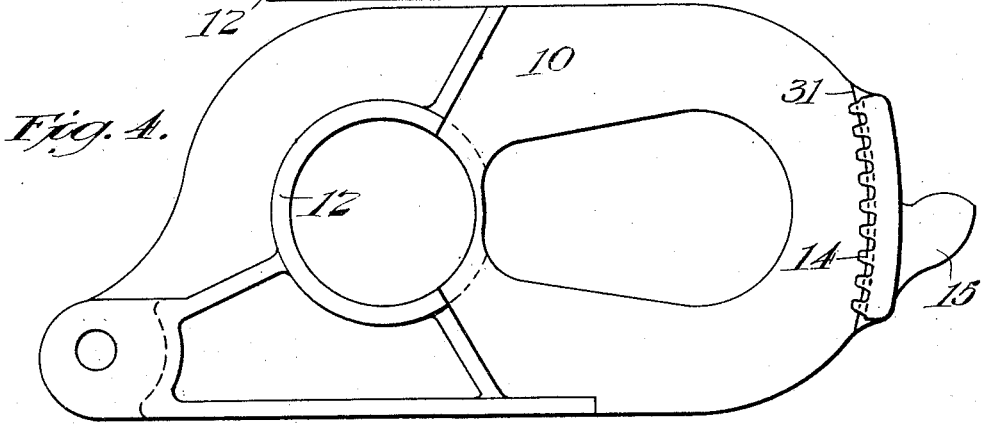
Figure 5:
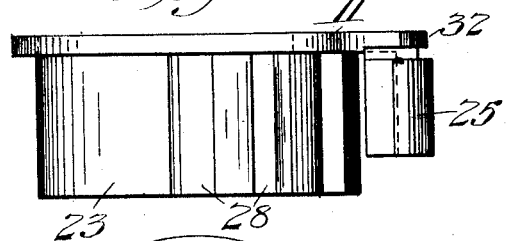
Figure 6:
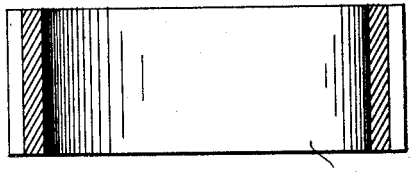
Figure 7:
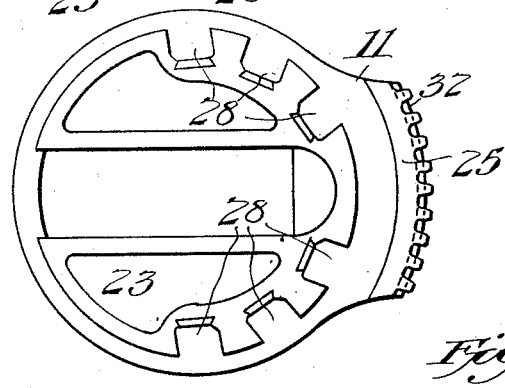
Figure 8:
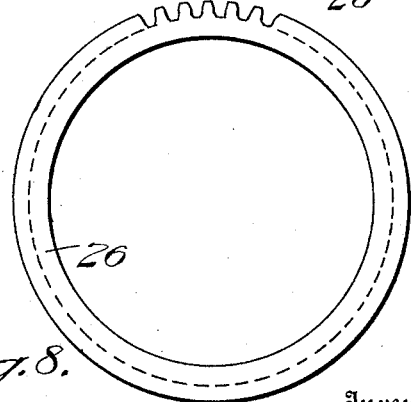

A sleeve $C'$ is mounted on the inner ends of the bearings $a^5$ and $a^6$ for shaft C and surrounds said gear $c$, the sleeve being supported by said bearings and the gear adapted to turn freely within it. A pair of levers 10 are pivoted on said sleeve. Said levers are of duplicate form which is best illustrated in Figs. 3 and 4, each being formed with a hub 12 formed to journal on sleeve $C'$, each hub being of a length to extend substantially one-half the length of said sleeve. Said levers are thus mounted to rock on said sleeve, side by side, as shown. The rear end of each lever is formed with a housing in which is pivoted a roller 13, said roller being arranged to bear against the under faces of cams $b'$ and $b^2$. The forward end of each of said levers has a segmental rack 14 formed thereon the face of which is adjacent to and parallel with its hub. A lug 15 is formed on the extreme forward end of each lever against which the lower end of a coiled spring 16 bears. Said coiled spring 16 is mounted in a tubular casing 17 which is mounted in the forward end of the top $A'$. A screw-plug 18 is mounted in the top of each tubular casing 17, by the adjustment of which the tension of said springs may be regulated. When in position, as shown in Fig. 1, said springs will normally force the opposite ends of said levers downwardly, holding the anti-friction rollers 13 into close contact with the cams on the driving shaft at all times.

A pivot shaft 20 is mounted on the lower ends of hangers 21 which are supported on a rock-shaft 22 journaled in bearings in the top $A'$. A wheel center 23 formed with a radial slot is pivoted adjacent to each lever 10 on said pivot-shaft 20 by means of a box 24, which is journaled on said pivot-shaft and mounted to slide in said radial slot in said center. Each wheel center 23 is formed on its front end with a flange 11 projecting for a distance beyond its face and having a segment 25 with teeth adapted to mesh with the teeth on rack 14 of the levers 10. A rim 26 with gear teeth on its periphery is mounted on each wheel center 23 and connected to move therewith in one direction by means of roller clutches 27 mounted in a series of pockets 28 in the periphery of center 23, said pockets being formed with tapered bottoms so that the movement of center 23 in one direction will cause the rollers 27 to impinge against the inner surface of rim 26 and lock said rim to said center, while when they turn in the opposite direction said rollers will release their grip on the surface of said rim and permit it to turn independently. Spring mounted plungers 29 are adapted to bear against said rollers 27, engaging with a central circumferential groove therein to hold said rollers from longitudinal movement and also insure a quick acting lock between wheel centers 23 and rims 26 when said centers are started forward. Said gear rims 26 project through slots in the sides of sleeve C' and mesh with the teeth of gear $c$ on the driven shaft C. A lever 30 is connected with rock-shaft 22 by which said rock-shaft may be rocked to slide box 24 and adjust the position of shaft 20 in relation to the radial slots in wheels 23. Any appropriate means may be provided for holding said lever and parts in adjusted position.

Adjacent to the teeth of racks 14 a shoulder 31 is formed on levers 10 and a corresponding shoulder 32 is formed on the forward ends of wheels 23 adjacent to the teeth of racks 25, said shoulders in each instance being above the base of the teeth preferably on the pitch line thereof and bear against each other serving to take the thrust between the two parts and furnish a smooth surface for the rocking bearing between them, the teeth merely serving for the purpose of transmitting the motion, as will be readily understood. Said shoulders are formed on segmental lines struck from the axis around which levers 10 rock, thus insuring against any binding in any position of the parts.

In operation, the parts being in the position shown in Figs. 1 and 2, and the driving shaft B being set in motion, cam $b'$ operates through the anti-friction wheel 13 on the rear end of adjacent lever 10 to continue the downward motion of said rear end and force the opposite end upward, which, through the connection between the toothed rack 14 on said lever and the toothed rack 25 on wheel 23, turns said wheel 23 upward around shaft 20 and by means of the roller clutches carries with it the rim 26 thereon, thus transmitting the motion to gear $c$ and the driven shaft C. Just before the cam $b'$ reaches the limit of its downward motion, cam $b^2$ begins to force the rear end of the other lever 10 downwardly, which, in the same manner, operates through the other set of mechanism to transmit the motion to the driven shaft. Thus before one cam ceases operating in forcing its lever downward, the other cam begins a like operation upon the other lever and thus the motion is transmitted constantly and regularly. The operation of said cams $b'$ and $b^2$ can best be understood by an examination of Figs. 9 and 10. In Fig. 10 is illustrated, in a diagrammatic manner, the relative position of the two cams throughout the entire revolution of the driving shaft. In said view the cam $b'$ is shown at the limit of its movement, or just as it ceases to further operate the lever 10 in a downward direction at point $x$ and by referring to the position of cam $b^2$ at the same moment, it will be noted that it has already begun to move downwardly at point $z$ carrying with it the other lever 10 and that the operation will thus be continuous and regular, for by the time the extreme outer point of cam $b^2$ reaches the limit of its operative position, cam $b'$ will again have started its work in forcing the rear end of its lever downward.

In Figs. 1 and 2 shaft 20 is shown in a central position, in which position the speed transmitted from one side to the other of wheel 23 will be uniform. By means of the lever 30 and rock-shaft 22, said shaft 20 may, however, be adjusted to any position along the length of radial slot in said wheel 23, as indicated by dotted lines in Fig. 1. When thrown to the extreme position on one side of the center of said wheel, the slowest speed attainable will be made and when thrown to the opposite extreme the highest speed attainable will be made. As the box 24 carrying said shaft 20 may be slid gradually, adjusted to and secured at any point desired throughout the length of said slot, it will be seen that any change in speed desired may be secured and that it will be a gradual change and not a sudden jump from one speed to another as in many forms of change speed gearing. The springs 16 operate at all times to return the levers 10, holding the rear ends thereof constantly against the cams $b'$ and $b^2$ so that the moment either cam ceases to force the rear end of its lever downward, the roller clutches are released and centers 23 and rims 26 thereon permitted to move independent of each other.

Having thus fully described my said invention, what I claim as new and desire to secure by Letters Patent, is:

1. In a variable speed gearing, the combination of a driving shaft, a driven shaft, and gearing for transmitting motion from said driving shaft to said driven shaft comprising a shiftable fulcrum, a center mounted on said shiftable fulcrum, a gear on said center, a clutch connection between said center and said gear for holding said gear to turn therewith in one direction, an oscillating member operated by said driving shaft and geared to said center for turning the same around its axis in a forward direction, and means for operating said member in the opposite direction, substantially as set forth.

2. In a variable speed gearing, the combination of a driving shaft, a driven shaft, a gear thereon, means for transmitting motion from said driving shaft to said driven shaft comprising gears which mesh with the gear on said driven shaft and are mounted on centers, clutch mechanism connecting said gears and centers, said centers mounted on a pivot-shaft, said pivot-shaft arranged to slide in radial ways in said centers, means for adjusting the position of said shaft in relation to the axis of said centers, oscillating parts mounted to be operated by cams on the driving shaft, said cams arranged to operate in a forward direction successively, gear connections between said oscillating parts and said centers, and means for operating said oscillating parts reversely to the operation of the cams, substantially as set forth.

3. A variable speed gearing comprising a driving shaft, a driven shaft, a gear on the driven shaft, oscillating members pivoted around the axis of said driven shaft, cams on said driving shaft arranged to operate successively on said oscillating members, a pivot-shaft, shiftable centers thereon, gears on said centers, the rims of which mesh with the gear on said driven shaft, clutch mechanism connecting said gears to said centers, said centers having arms extending out therefrom and having toothed racks coöperating with toothed racks on the adjacent ends of said oscillating members which mesh therewith, and means for adjusting and securing the sliding bearings for said pivot shaft, substantially as set forth.

4. In a variable speed gearing, the combination of a driving shaft, a driven shaft, and means for transmitting motion from the driving shaft to the driven shaft comprising a shiftable pivot, and a gear mounted on said pivot shiftable in relation to the axis of said gear, substantially as set forth.

5. In a variable speed gearing, the combination of a driving shaft, a driven shaft, and means for transmitting motion from the driving shaft to the driven shaft comprising an oscillating gear, a pivot carrying said oscillating gear and shiftable in relation to its axis, and means for shifting said pivot, substantially as set forth.

6. In a variable speed gearing, the combination of a driving shaft, a driven shaft, and means for transmitting motion from the driving shaft to the driven shaft comprising an oscillating gear, means connected with the driving shaft for oscillating said gear, said gear being formed with a radial way, a box mounted to slide in said way, a pivot shaft mounted in said sliding box, and means for sliding said box and shaft along said way, substantially as set forth.

7. In a variable speed gearing, the combination of a driving shaft, a driven shaft, and means for transmitting motion from the driving shaft to the driven shaft comprising a plurality of oscillating gears, means connected with the driving shaft for oscillating the same successively, a pivot on which said oscillating gears are mounted, and means for shifting said pivot radially in said gears, substantially as set forth.

8. A variable speed gearing comprising a driving shaft, a driven shaft, a plurality of successively operating gears for transmitting motion from the driving shaft to the driven shaft, means connected with the driving shaft for operating said gears successively, a shiftable fulcrum for one gear in each set, and means for shifting said fulcrum in relation to the axis of said gear, substantially as set forth.

9. A variable speed gearing comprising a driving shaft, a driven shaft, a gear thereon, a multiplicity of gears arranged to mesh with the gear on said driven shaft, means connected with the driving shaft for operating said gears successively, and means for transmitting motion from the driving shaft to said gears comprising rocking levers pivoted around the axis of the driven shaft, and operatively connected at one end with the driving shaft and at the other end with said gears which mesh with said driven shaft, substantially as set forth.

10. A variable speed gearing comprising a driving shaft, a driven shaft, and mechanism for transmitting motion from said driving shaft to said driven shaft comprising rocking levers operatively connected with said driving shaft on one side of their pivot and operatively connected on its other side to intermediate gears, said intermediate gears meshing with the gear on the driven shaft, said intermediate gears clutch-mounted on their centers, and means connected with the driving shaft for successively operating said levers, substantially as set forth.

11. A variable speed gearing comprising a driving shaft, a driven shaft, a gear on said driven shaft, mechanism for transmitting motion from said driving shaft to said driven shaft comprising levers operatively connected with said driving shaft to be successively oscillated thereby, intermediate gearing meshing with the gear on the driven shaft, gears on the opposite ends of said levers also meshing with said intermediate gearing, clutch mechanism for connecting the rims of said intermediate gears to their centers, said centers, a shiftable axis on which said intermediate gears are mounted, and means for shifting said axis, substantially as set forth.

12. A variable speed gearing comprising a driving shaft, a driven shaft, a gear on said driven shaft, oscillating levers pivoted around the axis of said driven shaft and operatively connected at one end with said driving shaft, intermediate gearing mounted to mesh with a rack on the opposite end of said levers and with the gear on said driven shaft, the part meshing with the rack on the lever being connected to the part meshing with the gear on the driven shaft by clutch mechanism, substantially as set forth.

13. A variable speed gearing comprising a driving shaft, a driven shaft, a gear thereon, oscillating levers pivoted around the axis of said driven shaft operatively connected at one end with the driving shaft and provided with toothed racks at their opposite ends, intermediate gearing engaging with said toothed racks and the gear on said driven shaft, said toothed racks and the adjacent flange of said gear being formed with abutting segmental shoulders adapted to take the rocking wear between the parts, substantially as set forth.

14. A variable speed gearing comprising a driving shaft, a driven shaft, mechanism for transmitting motion from said driving shaft to said driven shaft, comprising oscillating levers and intermediate gears, and a gear connection between said oscillating levers and intermediate gears, said parts being formed with curved bearing faces adjacent to said gear connection which rock upon each other in operation, substantially as set forth.

In witness whereof, I have hereunto set my hand and seal at Washington, District of Columbia, this 22nd day of March, A. D. nineteen hundred and eleven.

ABRAHAM B. LANDIS. [L. S.]

Witnesses:
E. W. BRADFORD,
J. D. YOAKLEY.